United States Patent
Ong

(10) Patent No.: US 7,308,371 B2
(45) Date of Patent: Dec. 11, 2007

(54) BIT ERROR RATE TESTING FOR HIGH-SPEED DEVICES

(75) Inventor: Shao Chee Ong, Georgetown (MY)

(73) Assignee: Intel Corporation, Santa Clara, CA (US)

( * ) Notice: Subject to any disclaimer, the term of this patent is extended or adjusted under 35 U.S.C. 154(b) by 176 days.

(21) Appl. No.: 10/868,243

(22) Filed: Jun. 15, 2004

(65) Prior Publication Data

US 2005/0278589 A1    Dec. 15, 2005

(51) Int. Cl.
*G06F 19/00* (2006.01)

(52) U.S. Cl. .......................... 702/69; 702/66; 702/125; 702/79; 714/55; 375/226

(58) Field of Classification Search ........... 340/870.21; 341/108, 110, 155; 702/69, 117, 182, 183, 702/66, 74, 79, 89, 125, 126; 714/69, 117, 714/55, 704; 375/226, 371; 369/47.35, 369/53.16, 59.21, 47.53
See application file for complete search history.

(56) References Cited

U.S. PATENT DOCUMENTS

| | | | |
|---|---|---|---|
| 4,920,537 A | 4/1990 | Darling et al. | |
| 5,023,872 A | 6/1991 | Annamalai | |
| 5,163,051 A | 11/1992 | Biessman et al. | |
| 5,448,616 A | 9/1995 | Kaewell, Jr. et al. | |
| 5,452,333 A * | 9/1995 | Guo et al. | 375/371 |
| 5,726,991 A | 3/1998 | Chen et al. | |
| 6,088,415 A * | 7/2000 | Gaudet | 375/376 |
| 6,108,801 A | 8/2000 | Malhotra et al. | |
| 6,438,717 B1 | 8/2002 | Butler et al. | |
| 6,560,727 B1 | 5/2003 | Pierson et al. | |
| 6,628,621 B1 | 9/2003 | Appleton et al. | |
| 6,694,273 B2 * | 2/2004 | Kurooka et al. | 702/69 |
| 6,745,148 B2 | 6/2004 | Abramovitch | |
| 6,777,929 B2 | 8/2004 | Fang et al. | |
| 6,912,474 B2 * | 6/2005 | Richmond | 702/125 |
| 2003/0103590 A1 * | 6/2003 | Budde et al. | 375/355 |

* cited by examiner

*Primary Examiner*—Carol S. W. Tsai
(74) *Attorney, Agent, or Firm*—Schwabe, Williamson & Wyatt

(57) ABSTRACT

A method and system for performing a bit error rate test on a device with substantial duty cycle output distortion are described herein.

23 Claims, 5 Drawing Sheets

BIT ERROR RATE TESTING FOR HIGH-SPEED DEVICES

TECHNICAL FIELD & BACKGROUND

The present disclosure relates generally to the field of microelectronics. More specifically, the present disclosure is related to bit error rate testing of high speed devices with a substantial duty cycle distortion of an output signal (relative to the size of a bit period).

High-speed data communications requirements have prompted the development of devices, such as serializer/deserializer (Serdes) chips, that can send and receive data over a parallel link, thus transferring data at high Gigabit rates. Signal jitters or duty cycle distortion of the output signal of such devices, because of their high speed, can account for a substantial portion of a bit period. Accordingly, it can be a challenge to test such devices using automated test equipment ("ATE"). As a result, a bit error rate test on such a device must often be performed using equipment external to the ATE. The use of such external bit error rate testers, however, can be costly and time-consuming, especially for high-volume manufacturing facilities.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Embodiments of the present invention include, but are not limited to, a method and system for performing a bit error rate test on a device having a substantial duty cycle output distortion (relative to the size of a bit period).

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding embodiments of the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1A:
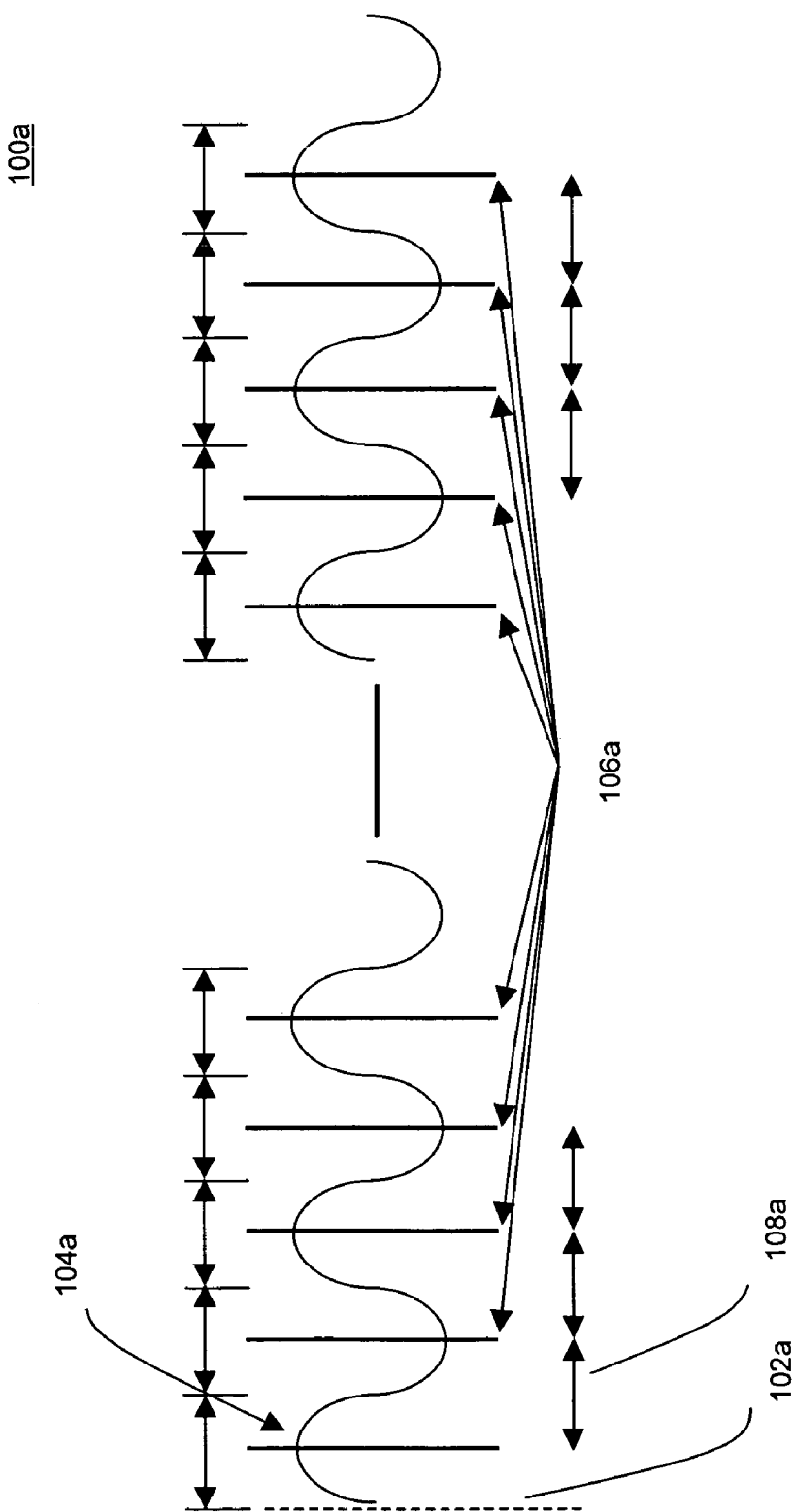
FIG. 1a illustrates a prior art method for decoding a 50% duty cycle waveform received from a device under test.
Figure 1B:
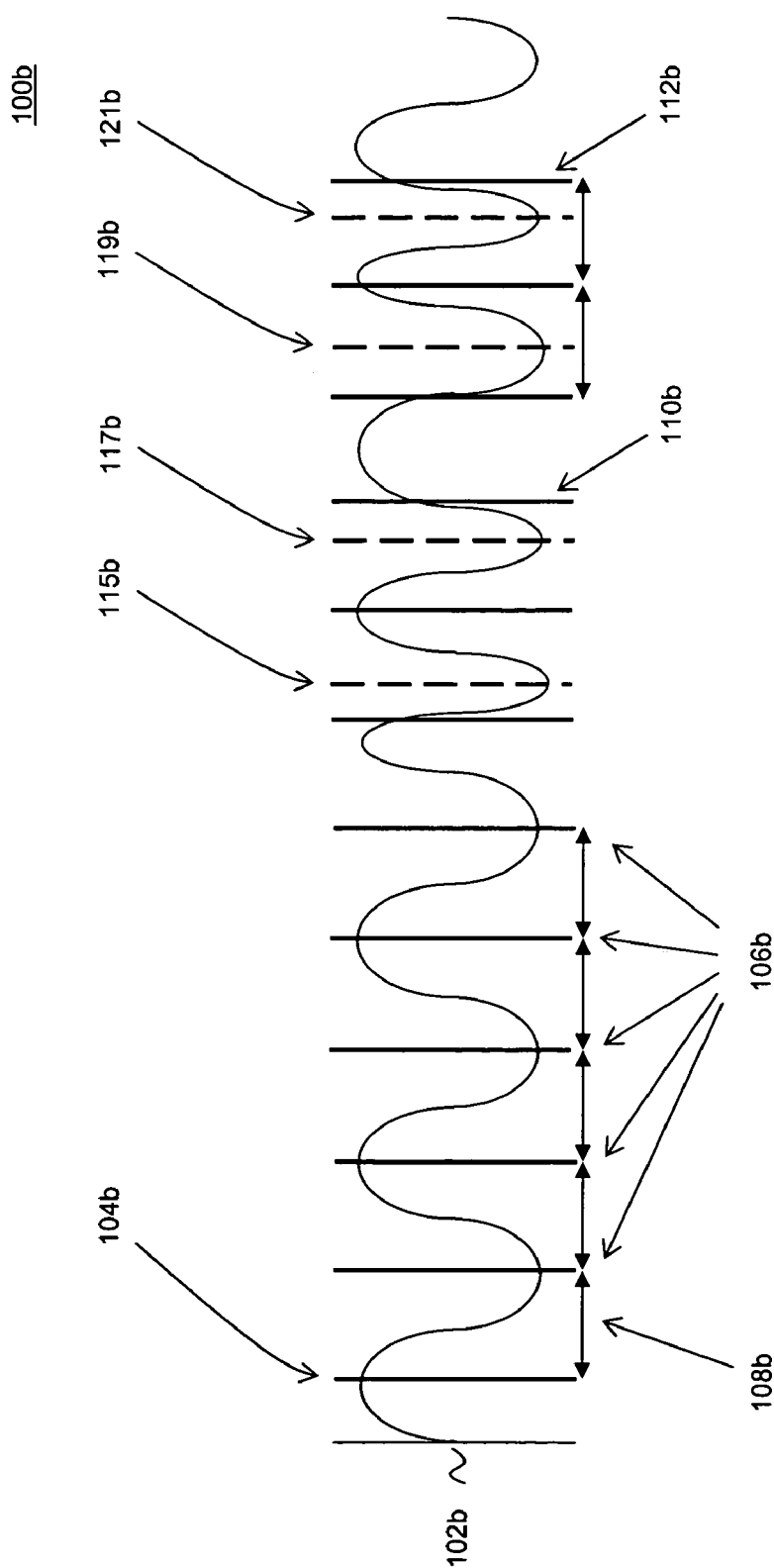
FIG. 1b illustrates the prior art method of FIG. 1a as applied to a distorted duty cycle waveform received from a high-speed device under test.

FIGS. 1a and 1b illustrate decoding of digitized waveforms based on a first edge location such as during a conventional bit error rate test performed by an automated test equipment ("ATE"). FIG. 1a illustrates a non-distorted 50% duty cycle waveform as may be received from a communication device with a "low" data output rate, e.g. an output speed of less than 10 Gigabits per second (Gbps). At the beginning of a decoding process, a digitizer may digitize an analog capture or waveform received from operation of the device. A digitizer "digitizes" a waveform by periodically sampling its magnitude and generating digital data indicating the magnitude of each sample. As illustrated in FIG. 1a, based on the digitization of waveform 100a, a first edge 102a may be located to serve as a reference location for a selection and performance of sampling points on waveform 100a. First edge 102a may be located in part by an undersampling and slicing of waveform 100a.

Thus, as shown in FIG. 1a, based on located first edge 102a, a first sampling point 104a at a center of a bit may be selected and performed. Subsequent sampling points 106a may then be selected and performed at consecutive sampling intervals 108a, starting from first sampling point 104a. In this example, each sampling interval 108a includes an equal number of sampling points and corresponds to a digitizer sampling period used to digitize a bit for waveform 100a. As illustrated, because waveform 100a has an undistorted 50% duty cycle waveform, sampling points 106a have been selected and performed at centers of bits, thus resulting in substantially correct bit information for bit error rate testing purposes. Note that a bit error rate (BER) may be calculated as a percentage of bits that have errors relative to a total number of bits received or transmitted.

FIG. 1b illustrates an example of a distorted duty cycle waveform 100b such as may be received from a high speed device operated at a "high" data output rate, e.g. a data output rate greater than 10 Gbps with a jitter rate or duty cycle distortion rate as high as 20 Pico seconds (approximately 20% of a bit period). In one embodiment, the device has a duty cycle output distortion of 20% or more. As a result of waveform distortion from jitter or other event, in contrast to waveform 100a, a decoding process based on a first edge location may result in incorrect bit information if applied to waveform 100b. For example, if sampling were performed in a similar manner as the process in FIG. 1a, sampling points 106b would be selected and performed at consecutive sampling intervals 108b, starting from first sampling point 104b, which was determined based on a first edge 102b. As illustrated in FIG. 1b, sampling points 106b may be correctly performed at centers of bits for an initial few undistorted cycles of waveform 100b. Waveform distortion, however, may soon cause sampling points to misalign. For example, as illustrated, sampling points are not performed at 115b, 117b, 119b and 121b, resulting in incorrect bit information. Additionally, sampling points 110b and 112b are performed at incorrect locations, to give incorrect bit information as well.

Figure 2:
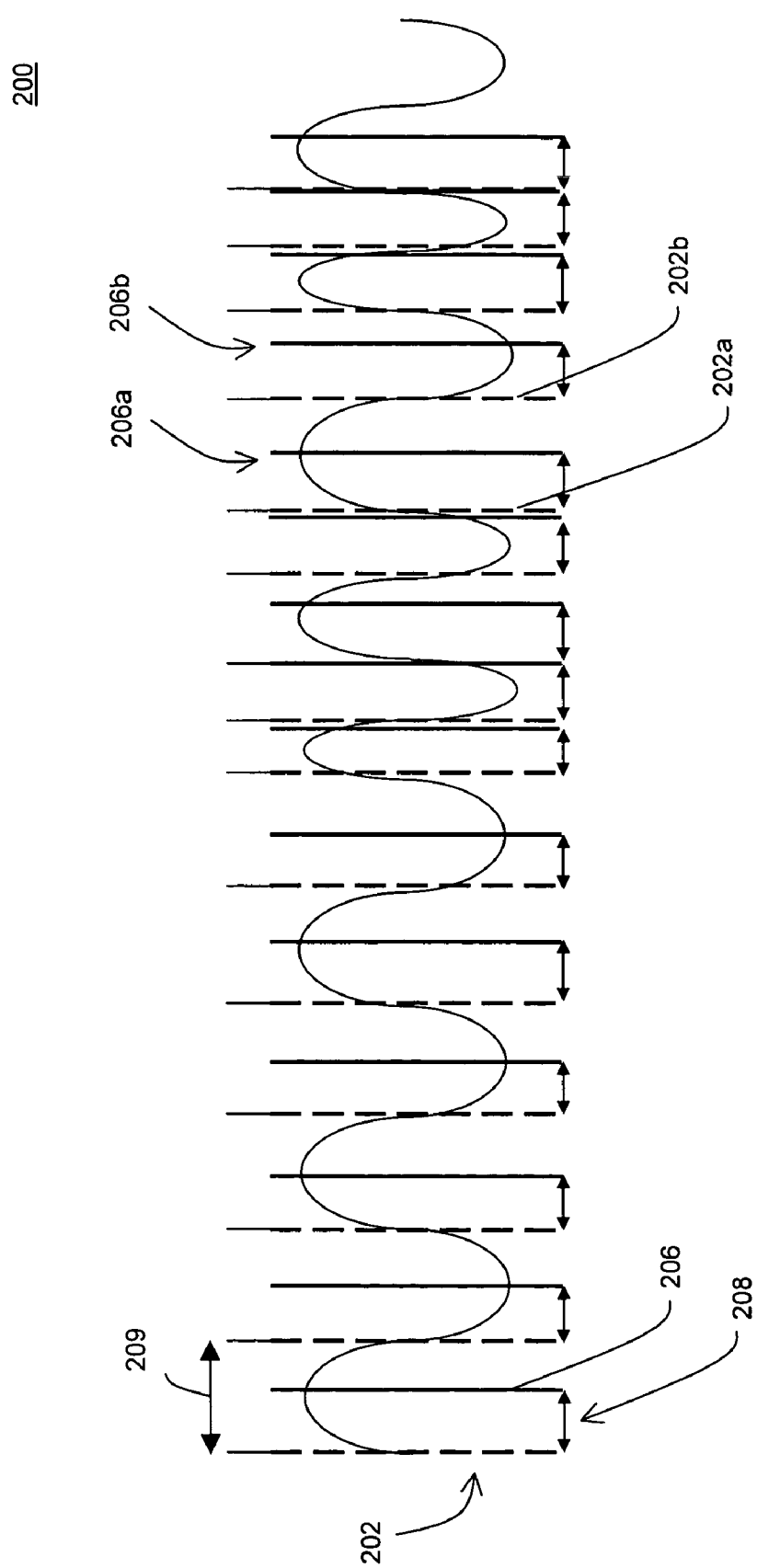
FIG. 2 illustrates a method for decoding the waveform of FIG. 1b, in accordance with one embodiment.

FIG. 2 illustrates a method for decoding the waveform of FIG. 1b, in accordance with an embodiment. For the embodiment, data is received from operation of a device at a data output rate of greater than 10 Gbps, and having a duty cycle output distortion of up to 20 Picoseconds (approximately 20% of a bit period). In the embodiment, an analog capture or waveform 200 of the data may be digitized. Next, in the embodiment, based on the digitization, an approximate edge 202 of waveform 200 may be determined or located. A sampling point 206 may then be selected and performed at a sampling interval 208 commencing at located edge 202.

Note that for the embodiment, sampling interval 208 may comprise a predetermined number of sampling points from located edge 202. In one embodiment, sampling interval 208 may be approximately half of a digitizer sampling period used to digitize waveform 200 in order to achieve a sampling point 206 approximately near a center of a bit.

For the embodiment, the above process of locating edge 202, selecting a sampling point 206 and performing sampling point 206 may be repeated. The process may be repeated so that multiple approximate edges 202 may be located and may include substantially each edge 202 included in waveform 200. Thus, for the embodiment, multiple sampling points 206 may be selected and performed at approximate centers or vicinities of approximate centers of substantially each sampling period 209 of waveform 200 (note that for clarity, only one edge 202, one sampling point 206, and one sampling period 209 has been labeled in the figure). For the embodiment, each sampling period 209 corresponds to a sampling period commencing at a located edge and ending at a next located edge.

Note that in the embodiment, because samples may be performed at sampling intervals 208 from each located edge 202, rather than based on a first edge (see. FIG. 1 and accompanying description), sampling points 206 may be more likely to occur at approximate centers of bits and less likely to become misaligned. For example, in the illustrated embodiment, sampling point 206a is performed near the center of a bit as is sampling point 206b because sampling interval 208 may be taken subsequent to immediately previous located edges 202a and 202b, respectively. Also note that in alternate embodiments (such as illustrated in FIG. 3 below) that substantially each edge 202 included in waveform 200 may be located before sampling points 206 are selected or performed.

Figure 3:
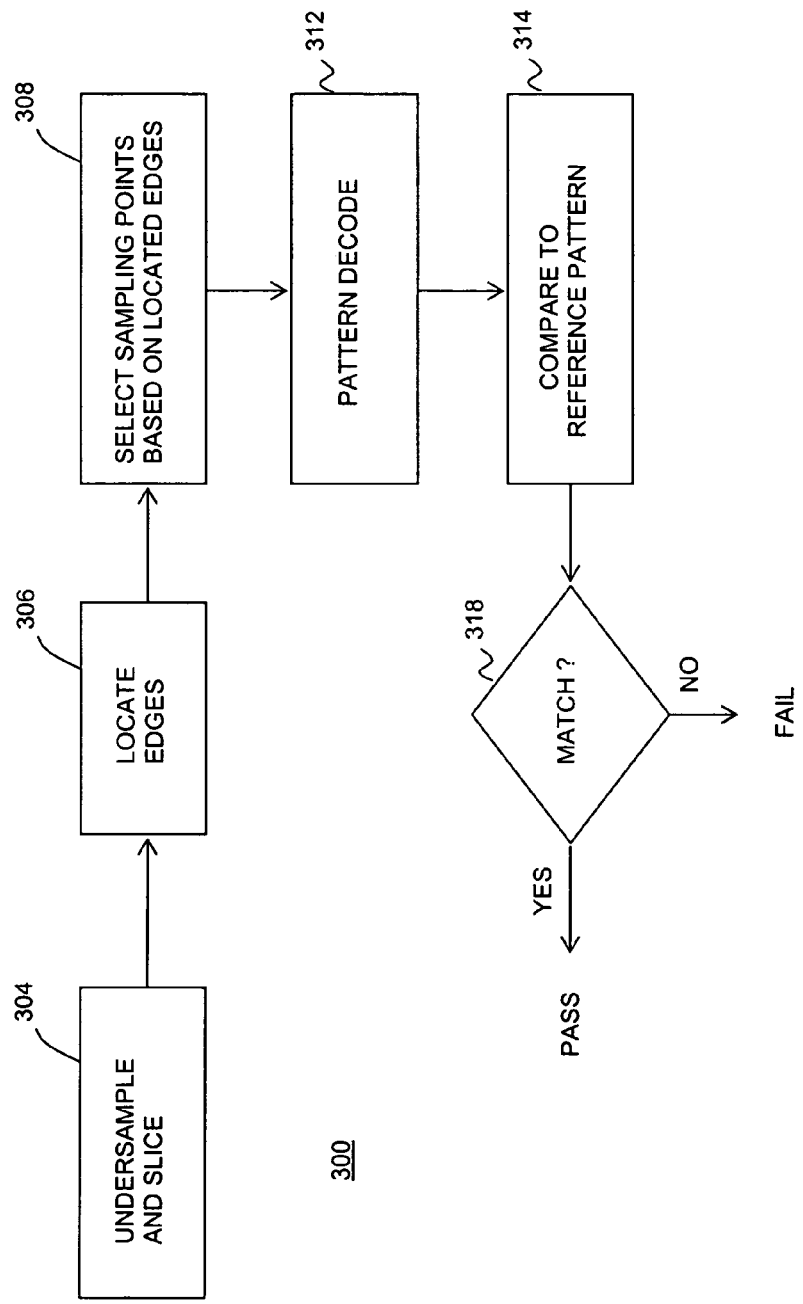
FIG. 3 is a flow diagram, illustrating an example sequence of events for performing a bit error rate test, in accordance with one embodiment.

FIG. 3 is a flow diagram 300 illustrating an example sequence of events for performing a bit error rate test associated with an embodiment. The method represented by portions of flow diagram 300 may be implemented by software, software modules, or other machine-readable instructions stored on one or more machine-readable storage medium. Note that in this embodiment, substantially each edge 202 included in waveform 200 may be located before sampling points 206 are selected or performed. In alternate embodiments, the method may be implemented in firmware or hardware.

Beginning at a block 304, for the embodiment, a digitized waveform received from a digitizer may be undersampled and sliced. Based on the undersampling and slicing of the waveform, approximate edges, such as edges 202 of waveform 200 (see FIG. 2) may be determined or located at a block 306. In the embodiment, multiple approximate edges 202 may be located and may include substantially each edge 202 included in waveform 200.

Next, at a block 308, for the embodiment, edge location information may be received and sampling points may be selected based on the information. For the embodiment, sampling points 206 may be selected and performed at intervals 208. In an embodiment, sampling points 206 may be selected and performed at approximate centers of substantially each of sampling periods 209 commencing at each of multiple located edges 202. As a result, sampling points 206 may be selected and performed at substantially a center of a bit between pairs of located edges 202 to result in substantially correct bit information for bit error rate testing purposes. Note that in the embodiment, the selection of sampling points may be at least partially based on a sampling period of a digitizer used to digitize waveform 200.

In the embodiment, values of the sampling points may be converted to digital 1's and 0's to perform a pattern decoding at a block 312. Such a process may also include a decimation to assist in converting the selected sampling points into digital data. A bit error rate may be calculated once the digital data is compared to a reference pattern at a block 314 in the embodiment. At a block 318, if the bit stream or digital data does not match a reference pattern to a desired degree, the device may fail a bit error rate test. If the stream does match the reference pattern, the device may pass.

Figure 4:
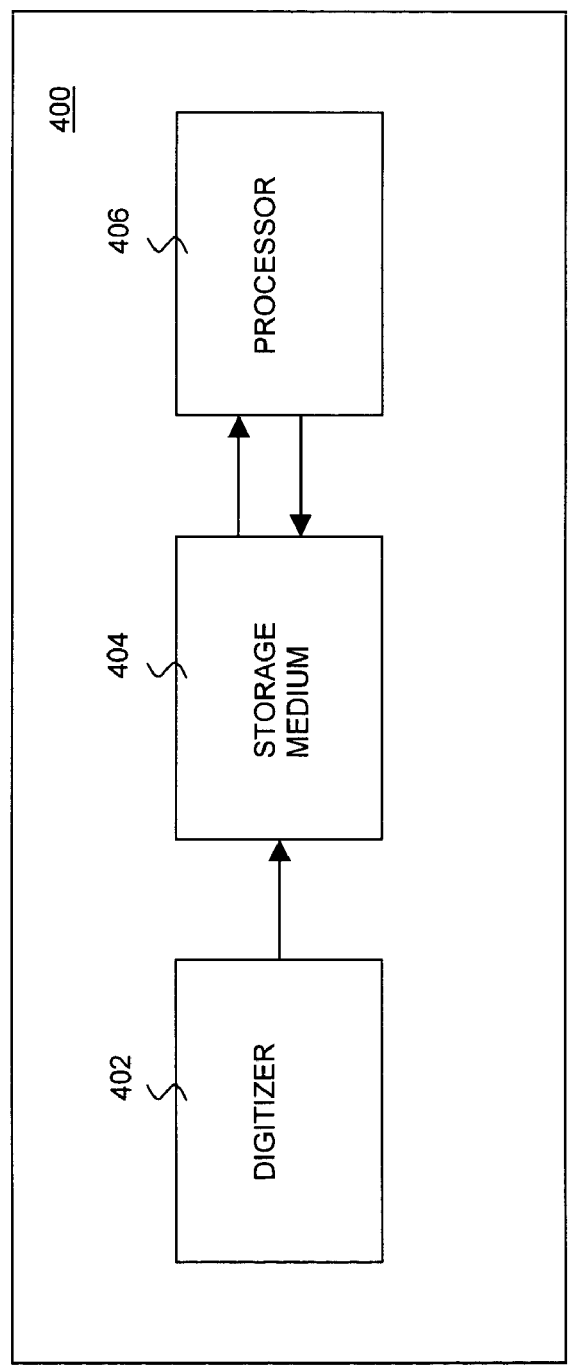
FIG. 4 illustrates a system for performing a bit error rate test, in accordance with one embodiment.

FIG. 4 illustrates an example system 400 in accordance with one embodiment. For the embodiment, system 400 includes a digitizer 402 to digitize an analog capture from a device under test operated with a high speed data output rate as well as substantial duty cycle distortion. As illustrated, storage medium 404 may be coupled to digitizer 402 to receive and store the digitization of the analog capture. For the embodiment, storage medium 404 may be coupled to a processor 406. Storage medium 404 may include machine-readable instructions, which if executed by processor 406 may cause processor 406 to receive the digitization of the analog capture and to locate an approximate edge of the analog capture based on the digitization of the analog capture. Processor 406 may also select a sampling point of a sampling period commencing at the located edge and then perform a sampling at the selected sampling point. In the embodiment, processor 406 may also repeat the locating, the selecting and the performing to perform sampling points from each located edge in the analog capture. In an embodiment, processor 406 may also execute directions in accordance with alternate embodiments of the invention, such as for example, as described in flow diagram 300 of FIG. 3. In an embodiment, system 400 may include or be included in an ATE or other suitable tester for devices having high data output rates. Thus, in various embodiments, system 400 may eliminate a need for a bit error rate tester external to an ATE.

Thus, it can be seen from the above descriptions, a novel method and system for performing a bit error rate test on a high speed device having a data output with substantial duty cycle distortion has been described. While the present invention has been described in terms of the foregoing embodiments, those skilled in the art will recognize that the invention is not limited to the embodiments described. The present invention can be practiced with modification and alteration within the spirit and scope of the appended claims.

Thus, the description is to be regarded as illustrative instead of restrictive on the present invention.

What is claimed is:

1. A method for performing a bit error rate test, comprising:
   receiving data from operation of a device having a distorted duty cycle output;
   digitizing an analog capture of the received data using a digitizer;
   locating an approximate edge of a bit period of the analog capture based on the digitization of the analog capture;

selecting a sampling point of a sampling period commencing at the located edge; performing a sampling at the selected sampling point to result in substantially correct bit information for bit error rate testing; and repeating the locating, the selecting, and the performing.

2. The method of claim 1, wherein the receiving of the data comprises receiving data from operation of a device having a duty cycle output distortion of 20% or more.

3. The method claim of 1, wherein the selecting of the sampling point comprises selecting an approximate center of the sampling period, the sampling period commencing at the located edge and ending at a next edge, and the performing comprises performing a sampling at the selected approximate center of the sampling period commencing from the located edge and ending at the next edge.

4. The method of claim 3, wherein the selecting of the approximate center of the sampling period commencing at the located edge comprises selecting a sampling point that is a predetermined number of sampling points from the located edge.

5. The method of claim 4, wherein the selecting of the sampling point that is a predetermined number of sampling points from the located edge comprises selecting a sampling point subsequent to the located edge by approximately half of a digitizer sampling period.

6. A method for performing a bit error rate test, comprising:

receiving a digitization of an analog capture of data output from a device;

locating multiple approximate edges of a bit period of the analog capture based on the digitization of the analog capture;

selecting a sampling point of a sampling period commencing at each of the multiple located edges;

performing a sampling at each of the selected sampling points to result in substantially correct bit information for bit rate error testing; and repeating the locating, the selecting, and the performing.

7. The method of claim 6 wherein the receiving of the digitization comprises receiving a digitization of an analog capture of data output from a device having a data output rate of greater than 10 Gigabits per second.

8. The method of claim 6 wherein the locating multiple approximate edges of the analog capture comprises locating approximate edges of substantially each of the edges of the analog capture.

9. The method of claim 6 wherein the selecting a sampling point comprises selecting substantially a center of a bit between pairs of located edges, and the performing comprises performing a sampling at substantially a center of a bit between pairs of located edges.

10. The method of claim 9 wherein the selecting substantially the center of a bit between pairs of located edges comprises selecting a sampling point that is approximately half of a digitizer sampling period from the located edge.

11. The method of claim 6, further comprising:

performing a decimation and decoding process to convert the selected sampling points into digital data; and comparing the digital data with a reference pattern.

12. An article of manufacture, comprising:

a machine-readable medium having machine-readable instructions stored thereon, which if executed by a processor cause the processor to:

receive a digitization of an analog capture of output data from operation of a device under test having a duty cycle output distortion of 20% or more;

determine an edge of a bit period of the analog capture based on the received digitization of the analog capture of the output data;

select a sampling point of a sampling period commencing at the determined edge to result in substantially correct bit information for bit error rate testing;

perform a sampling at the selected sampling point; and repeat the determining, the selecting and the performing.

13. The article of manufacture of claim 12 wherein the instructions to select a sampling point include instructions to select an approximate center of the sampling period commencing at the determined edge, and the instructions to perform a sampling include instructions to perform a sampling at the approximate selected center of the sampling period commencing at the determined edge.

14. The article of manufacture of claim 13 wherein the instructions to repeat the determining, the selecting, and the performing include instructions to repeat the determining, the selecting and the performing to perform samples at the approximate selected centers of substantially each of the sampling periods of the analog capture.

15. The article of manufacture of claim 12 wherein the instructions to select a sampling point include instructions to select a sampling point that is approximately half of a digitizer sampling period from the determined edge and the instructions to perform a sampling include instructions to perform a sampling at the selected sampling point that is approximately half of a digitizer sampling period from the determined edge.

16. The article of manufacture of claim 12 wherein the storage medium further includes instructions stored thereon to:

perform a decimation and decoding process to convert the selected sampling points into digital data; and compare the digital data with a reference pattern.

17. An apparatus to perform a bit error rate test on a device with a data output rate greater than 10 Gigabits per second, comprising:

a first unit to locate approximate edges of a bit period of a waveform based on a digitization of the waveform, the waveform from the device outputted at a data output rate greater than 10 Gigabits per second;

a second unit coupled to the first unit to receive edge location information from the first unit and to select sampling points commencing at each located edge based on the edge information; and a third unit coupled to the second unit to perform a sampling at each of the selected sampling points resulting in substantially correct bit information for bit error rate testing on a device with a data output rate greater than 10 Gigabits per second.

18. The apparatus of claim 17, further including a digitizer coupled to the first unit to digitize the waveform.

19. The apparatus of claim 18, wherein the second unit selects sampling points commencing at each located edge at least partially based on a sampling period of the digitizer.

20. The apparatus of claim 19 wherein the sampling period of the digitizer is approximately divided in half.

21. A system for performing a bit error rate test on a device operated with a duty cycle output distortion of 20% or more, comprising:

a digitizer to digitize an analog capture of data output from the device;

a storage medium coupled to the digitizer to receive the digitization of the analog capture; and a processor coupled to the storage medium to:

locate an approximate edge of a bit period of the analog capture based on the digitization of the analog capture;
select a sampling point of a sampling period commencing at the located edge; perform a sampling at the selected sampling point to result in substantially correct bit information for bit error rate testing; and
repeat the locating, the selecting, and the performing.

22. The system of claim 21 wherein the processor selects the sampling point based on approximately half of a digitizer sampling period from the located edge.

23. The system of claim 21, further comprising an automated test equipment having at least the digitizer.

* * * * *